(12) United States Patent
Aronowitz et al.

(10) Patent No.: US 10,559,312 B2
(45) Date of Patent: Feb. 11, 2020

(54) USER AUTHENTICATION USING AUDIOVISUAL SYNCHRONY DETECTION

(71) Applicant: International Business Machines Corporation, Armonk, NY (US)

(72) Inventors: Hagai Aronowitz, Petah Tikva (IL); Amit Aides, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 15/246,574

(22) Filed: Aug. 25, 2016

(65) Prior Publication Data

US 2018/0063106 A1  Mar. 1, 2018

(51) Int. Cl.
*G10L 17/24* (2013.01)
*H04L 29/06* (2006.01)
*G10L 25/24* (2013.01)
*G10L 25/57* (2013.01)
*G06K 9/00* (2006.01)

(52) U.S. Cl.
CPC .......... *G10L 17/24* (2013.01); *G06K 9/00234* (2013.01); *G10L 25/24* (2013.01); *G10L 25/57* (2013.01); *H04L 63/08* (2013.01)

(58) Field of Classification Search
CPC ......... H04L 63/08; G10L 17/24; G10L 25/57; G10L 25/24; G06K 9/00234
See application file for complete search history.

(56) References Cited

U.S. PATENT DOCUMENTS

| | | | | |
|---|---|---|---|---|
| 5,761,329 A | * | 6/1998 | Chen .................. | G06K 9/00892 382/116 |
| 6,219,639 B1 | * | 4/2001 | Bakis ................. | G06K 9/00885 382/116 |
| 7,900,049 B2 | * | 3/2011 | Wiese .................... | H04L 29/06 380/201 |
| 8,301,790 B2 | * | 10/2012 | Morrison ............. | G10H 1/0058 709/203 |

(Continued)

FOREIGN PATENT DOCUMENTS

WO   WO-2014207752 A1 * 12/2014   ............. G10L 25/57

OTHER PUBLICATIONS

Dalal et al ("Dalal", "Histogram of Oriented Gradients," pp. 1-8, Proceedings of the 2005 IEEE Computer Society Conference on Computer Vision and Pattern Recognition (CVPR'05)).*

(Continued)

*Primary Examiner* — Luu T Pham
*Assistant Examiner* — James J Wilcox
(74) *Attorney, Agent, or Firm* — Daniel Kligler

(57) ABSTRACT

Methods, computing systems and computer program products implement embodiments of the present invention that include receiving, at a first time, first video and first audio signals generated in response to a user uttering a passphrase, and receiving, at a second time subsequent to the first time, second video and second audio signals generated in response the user uttering the passphrase. Upon computing an audio temporal alignment between the first and the second audio signals and computing a video temporal alignment between the first and the second video signal, the user can be authenticated by comparing the audio temporal alignment to the video temporal alignment.

13 Claims, 2 Drawing Sheets

(56) References Cited

U.S. PATENT DOCUMENTS

| | | | | |
|---|---|---|---|---|
| 8,381,259 | B1* | 2/2013 | Khosla | H04N 5/04 |
| | | | | 725/141 |
| 8,442,820 | B2* | 5/2013 | Kim | G01C 21/3602 |
| | | | | 382/118 |
| 8,510,798 | B2* | 8/2013 | Candelore | H04N 7/163 |
| | | | | 380/241 |
| 8,571,867 | B2* | 10/2013 | Di Mambro | G06F 21/32 |
| | | | | 704/246 |
| 8,639,502 | B1* | 1/2014 | Boucheron | G10L 21/02 |
| | | | | 381/94.1 |
| 9,171,548 | B2 | 10/2015 | Velius et al. | |
| 9,338,493 | B2* | 5/2016 | Van Os | G06F 16/73 |
| 2009/0158039 | A1* | 6/2009 | Prasad | H04L 9/12 |
| | | | | 713/168 |
| 2010/0131273 | A1 | 5/2010 | Aley Raz et al. | |
| 2011/0035215 | A1* | 2/2011 | Sompolinsky | G10L 15/02 |
| | | | | 704/231 |
| 2014/0188770 | A1* | 7/2014 | Agrafioti | A61B 5/117 |
| | | | | 706/13 |
| 2015/0169943 | A1 | 6/2015 | Khitrov et al. | |
| 2015/0189344 | A1* | 7/2015 | Amidei | H04N 21/25825 |
| | | | | 725/116 |
| 2015/0281746 | A1* | 10/2015 | Lam | H04N 21/2368 |
| | | | | 725/116 |
| 2015/0347734 | A1 | 12/2015 | Beigi | |
| 2016/0007007 | A1* | 1/2016 | Nevet | G06F 21/32 |
| | | | | 726/19 |
| 2016/0063998 | A1* | 3/2016 | Krishnamoorthy | G10L 15/02 |
| | | | | 704/254 |
| 2016/0119338 | A1* | 4/2016 | Cheyer | G06F 21/32 |
| | | | | 726/4 |
| 2016/0234204 | A1* | 8/2016 | Rishi | G06F 21/31 |
| 2016/0286282 | A1* | 9/2016 | Marck | G06F 16/00 |
| 2017/0169297 | A1* | 6/2017 | Bernal | G06K 9/00771 |
| 2017/0374073 | A1* | 12/2017 | Schoppmeier | H04L 63/0861 |
| 2018/0039990 | A1* | 2/2018 | Lindemann | G06Q 20/40145 |
| 2018/0310048 | A1* | 10/2018 | Eber | H04N 21/485 |

OTHER PUBLICATIONS

Chetty et al ("Liveness Verification in Audio-Video Authentication," Interspeech 2004-ICSLP, 8th International Conference on Spoken Language Processing, ICC Jeju, Jeju Island, Korea, Oct. 4-8, 2004, pp. 1-4) (Year: 2004).*

Lu et al ("Lu," A Robust Technique for Motion-Based Video Sequences Temporal Alignment, IEEE Transactions on Multimedia, vol. 15, No. 1, Jan. 2013, pp. 70-82). (Year: 2013).*

Yehia et al ("Yehia," Quantitative Association of Vocal-Tract and Facial Behavior, Aug. 3, 1998, pp. 23-43) (Year: 1998).*

Bredin-"Audio Visual Speech Synchrony Measure for Talking Face Identity Verification," ICASSP, 2007, pp. 233-236.*

Bredin—"Audiovisual Speech Synchrony Measure: Application to Biometrics," Mar. 18, 2007, pp. 1-11.*

Aleksandr Melnikov et al., "Audiovisual Liveness Detection", Image Analysis and Processing—ICIAP 2015 vol. 9280 of the series Lecture Notes in Computer Science pp. 643-652.

Girija Chetty et al., "Automated lip feature extraction for liveness verification in audio-video authentication", Proceedings of the 10th Australian International Conference on Speech Science & Technology, Macquarie University, Sydney, Dec. 8-10, 2004.

* cited by examiner

USER AUTHENTICATION USING AUDIOVISUAL SYNCHRONY DETECTION

FIELD OF THE INVENTION

The present invention relates generally to user authentication, and specifically to audiovisual liveness detection using text-dependent audiovisual synchrony detection.

BACKGROUND

Audiovisual authentication, typically based simultaneously on the voice and face of a person, offers a number of advantages over both single-mode speaker verification and single-mode face verification, including enhanced robustness against variable environmental conditions. One of the most significant advantages of combined face-voice recognition is the decreased vulnerability against replay attacks, which could take the form of presenting either a voice recording to a single-mode speaker verification system or a still photograph to a single-mode face verification system.

The description above is presented as a general overview of related art in this field and should not be construed as an admission that any of the information it contains constitutes prior art against the present patent application.

SUMMARY

There is provided, in accordance with an embodiment of the present invention a method, including receiving, at a first time, first video and first audio signals generated in response to a user uttering a passphrase;

receiving, at a second time subsequent to the first time, second video and second audio signals generated in response the user uttering the passphrase, computing an audio temporal alignment between the first and the second audio signals, computing a video temporal alignment between the first and the second video signal, and authenticating the user by comparing the audio temporal alignment to the video temporal alignment.

There is also provided, in accordance with an embodiment of the present invention an apparatus, including a display configured to present a passphrase, and a processor configured to receive, at a first time, first video and first audio signals generated in response to a user uttering the passphrase, to receive, at a second time subsequent to the first time, second video and second audio signals generated in response the user uttering the passphrase, to compute an audio temporal alignment between the first and the second audio signals, to compute a video temporal alignment between the first and the second video signal, and to authenticate the user by comparing the audio temporal alignment to the video temporal alignment.

There is further provided, in accordance with an embodiment of the present invention a computer program product, the computer program product including a non-transitory computer readable storage medium having computer readable program code embodied therewith, the computer readable program code including computer readable program code configured to receive, at a first time, first video and first audio signals generated in response to a user uttering a passphrase, computer readable program code configured to receive, at a second time subsequent to the first time, second video and second audio signals generated in response the user uttering the passphrase, computer readable program code configured to compute an audio temporal alignment between the first and the second audio signals, computer readable program code configured to compute a video temporal alignment between the first and the second video signal, and computer readable program code configured to authenticate the user by comparing the audio temporal alignment to the video temporal alignment.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for text-dependent audiovisual synchrony detection. As described hereinbelow, first video and first audio signals (also referred to herein as enrollment data) are received that are generated in response to a user uttering a passphrase at a first time, and second video and second audio signals (also referred to herein as verification data) are received that are generated in response to a user uttering the passphrase at a second time subsequent to the first time. Upon computing an audio temporal alignment between the first and the second audio signals and a video temporal alignment between the first and the second video signals, the user can be authenticated by comparing the audio temporal alignment to the video temporal alignment, and detecting synchronization between the audio and the video temporal alignments.

By processing the audio and the visual signals in the verification data separately, embodiments of the present invention can exploit the fact that enrollment data for the user can be assumed to be synchronized. Advantages of system implementing embodiments of the present invention include simplicity of implementation, improved accuracy, and not requiring any audiovisual databases when computing and comparing the temporal alignments.

As described supra, systems implementing embodiments are typically simple to implement since they compare signals in the same domain. In other words, instead of comparing the first audio signal to the first video signal, and then comparing the second audio signal to the second video signal, systems implementing embodiments of the present invention "register" the second audio signal to the first audio signal (i.e., compute the audio temporal alignment), register the second video signal to the first video signal (i.e., compute the video temporal alignment), and authenticate the user by comparing the registrations.

In operation, the text-dependent audiovisual synchrony detection performed by systems implementing embodiments of the present invention can be used to detect system attacks such as spoofing attacks, in order to prevent unauthorized access to the computer system. Therefore, embodiments describe herein for text-dependent audiovisual synchrony detection can be one part of a multi-layered user authentication process that includes additional methods such as speaker recognition and face recognition.

Figure 1:
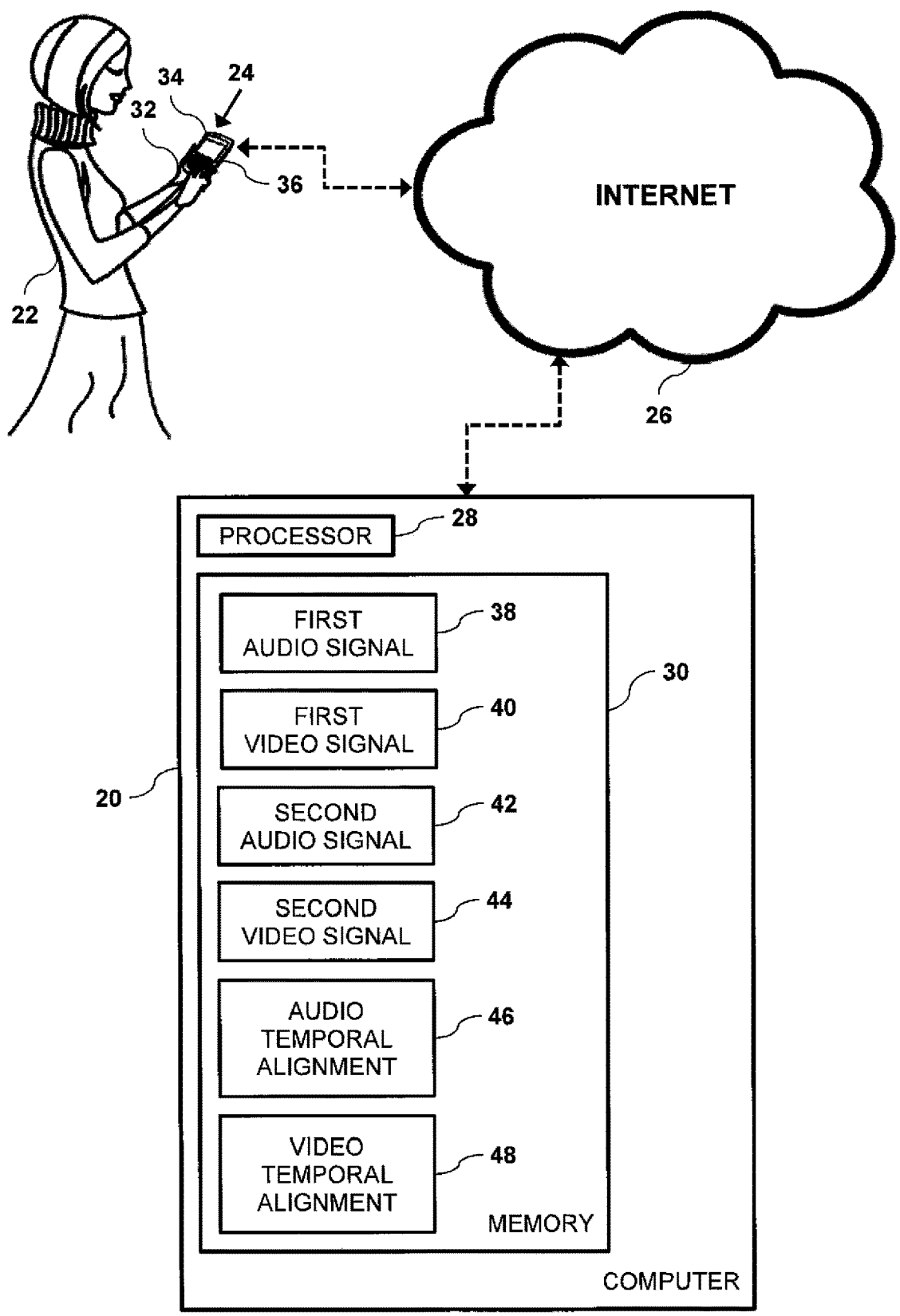
FIG. 1 is a block diagram that schematically illustrates a computer system configured to authenticate a user using text-dependent audiovisual synchrony detection, in accordance with an embodiment of the present invention.

FIG. 1 is a block diagram that schematically illustrates a computer 20 configured to verify a user 22 using text-dependent audiovisual synchrony, in accordance with an embodiment of the present invention. In the configuration shown in FIG. 1, the user interacts with computer 20 via a wireless communication device (e.g., a cellular phone) that communicates with computer 20 over an Internet connection 26.

Computer 20 comprises a processor 28 and a memory 30, and device 24 comprises a microphone 32, a camera 34 and a display 36. In operation, processor 28 receives, from device 24, a first audio signal 38, a first video signal 40, a second audio signal 42 and a second video signal 44, and stores the received audio and visual signals to memory 30. In embodiments of the present invention, as explained hereinbelow, processor 28 authenticates user 22 by computing an audio temporal alignment 46 between audio signals 38 and 42, computing a video temporal alignment 48 between video signals 40 and 44, and comparing the audio and the video temporal alignments.

In some embodiments, processor 28 can compute audio temporal alignment 46 by extracting, from the first and the second audio signals, speech-based features (not shown) such as mel-frequency cepstral coefficients, and then computing a dynamic time warping on the extracted speech-based features. In alternative embodiments, processor 28 can compute audio temporal alignment 46 by performing, on the first and the second audio signals, operations such as computing a deep neural network based analysis or performing a phonetic transcription analysis.

In additional embodiments, processor 28 can compute video temporal alignment 48 by extracting, from the first and the second video signals, visual-based features (not shown) such as a histogram of oriented gradients, and then computing a dynamic time warping on the extracted visual-based features. In alternative embodiments, processor 28 can compute video temporal alignment 48 by performing, on the first and the second video signals, operations such as computing a local binary pattern analysis and performing a region of interest analysis (e.g., a local binary pattern analysis that can incorporate a Viola-Jones object detection framework or a liveness detection analysis).

Processor 28 comprises a general-purpose central processing unit (CPU) or a special-purpose embedded processor, which are programmed in software or firmware to carry out the functions described herein. The software may be downloaded to computer 20 in electronic form, over a network, for example, or it may be provided on non-transitory tangible media, such as optical, magnetic or electronic memory media. Alternatively, some or all of the functions of processor 28 may be carried out by dedicated or programmable digital hardware components, or using a combination of hardware and software elements. Examples of memory 30 include dynamic random-access memories and non-volatile random-access memories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

USER ENROLLMENT AND AUTHENTICATION

Figure 2:
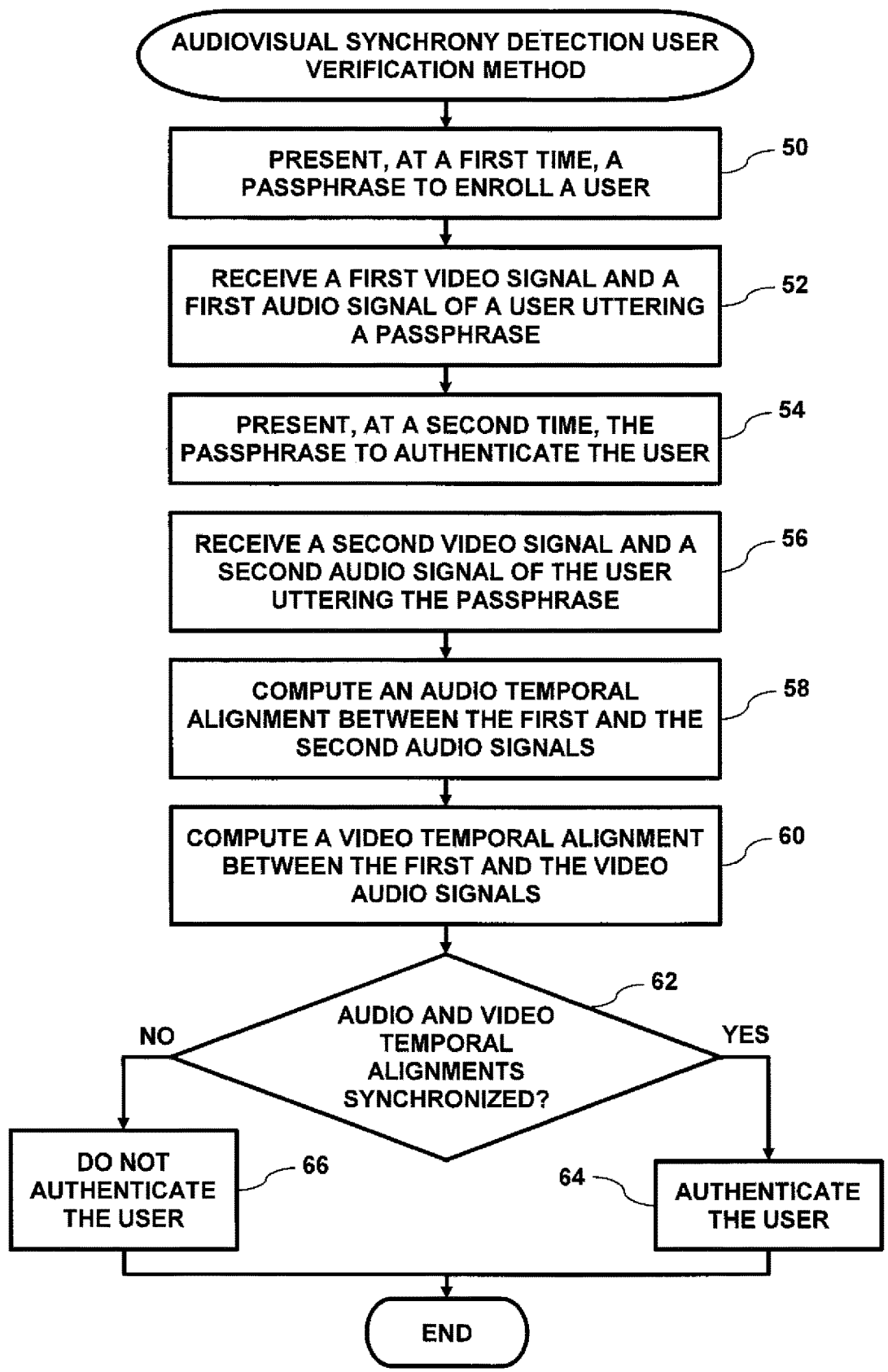
FIG. 2 is a flow diagram that schematically illustrates a method of authenticating the user using text-dependent audiovisual synchrony detection, in accordance with an embodiment of the preset invention.

FIG. 2 is a flow diagram that schematically illustrates a method of verifying user 22 by detecting audiovisual synchrony in enrollment data and verification data, in accordance with an embodiment of the present invention. In embodiments descried herein, the enrollment data comprises first audio signal 38 and first video signal 38, and the verification data comprises second audio signal 42 and second video signal 44.

At a first time, processor 28 initiates enrollment of user 22 by presenting a passphrase (not shown) to the user in a first presentation step 50, and in response to presenting the passphrase, the processor receives first audio signal 38 and first video signal 40 in a first receive step 52. In the example configuration shown in FIG. 1, processor 28 presents the passphrase to user 22 by conveying the passphrase to device 24 which then presents the passphrase on display 36. As the user utters the passphrase, microphone 32 captures and records sounds spoken by the user, camera 34 captures and records motions performed by the user (e.g., mouth movements), device 24 transforms the captured sounds into first audio signal 38 and transforms the captured motions into first video signal 40. Upon generating (i.e., via the transformations) first audio signal 38 and first video signal 40, device 24 conveys the first audio signal and the first video signal to computer 20. In embodiments of the present invention, the passphrase may comprise any number of words (e.g., multiple passphrases), numbers and characters (e.g., alphanumeric characters).

At a second time subsequent to the first time, processor 28 initiates verification of user 22 by presenting the passphrase to the user in a second presentation step 54, and in response to presenting the passphrase, the processor receives second audio signal 42 and second video signal 44 in a second receive step 56. In some embodiments, processor 28 performs steps 54 and 56 in a manner similar to the description referencing steps 50 and 52 hereinabove.

In a first computation step 58, processor 28 computes audio temporal alignment 46 between first audio signal 38 and second audio signal 42, and in a second computation step 60, the processor computes video temporal alignment 48 between first video signal 40 and second video signal 44. In embodiments of the present invention processor 28 authenticates (i.e., verifies) user 22 by detecting synchronization between the audio and the video temporal alignments.

In some embodiments, processor 28 can determine if the audio and the video temporal alignments are synchronized by comparing timeframes in the audio and the video signals (e.g., by comparing facial alignment in the video signals). For example, processor 28 can determine if the audio and the video temporal alignments are synchronized by first determining audio temporal alignment 46, projecting the audio temporal alignment on the video domain (comprising the first and the second video signals), and comparing the projected temporal alignment to video temporal alignment 48. Alternatively, processor 28 can determine the synchronization by first determining video temporal alignment 48, projecting the video temporal alignment on the audio domain (comprising the first and the second audio signals), and comparing the projected temporal alignment to audio temporal alignment 46.

In a comparison step 62, if processor 28 detects that the audio and the video temporal alignments are synchronized, then the processor successfully authenticates (i.e., confirms) user 22 in a first authentication step 64, and the method ends. However, if processor 28 does not detect that audio temporal alignment 46 and video temporal alignment 48 are synchronized, then the processor fails the authentication user 22 in a second authentication step 66, and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for preventing a replay attack, comprising:
   receiving, at a first time, first video and first audio signals generated in response to a user uttering a passphrase;

receiving, at a second time subsequent to the first time, second video and second audio signals generated respectively by a camera and a microphone in response the user uttering the passphrase;

extracting, from the received audio signals, speech-based features;

extracting, from the received video signals, visual-based features;

computing, by a processor, an audio temporal alignment between the first and the second audio signals, by computing a dynamic time warping on the audio-based features extracted from the first and second audio signals, the audio temporal alignment comprising a first registration that synchronizes the first and the second audio signals;

computing, by the processor, a video temporal alignment between the first and the second video signals, by computing a dynamic time warping on the video-based features extracted from the first and second video signals, the video temporal alignment comprising a second registration that synchronizes the first and the second video signals;

comparing the audio temporal alignment between the first and the second audio signals to the video temporal alignment between the first and the second video signals; and successfully authenticating the user upon detecting, as a result of the comparing, that the audio and the video temporal alignments are synchronized; and failing the authentication of the user upon detecting, as a result of the comparison, that the audio and the video temporal alignments are not synchronized.

2. The method according to claim 1, wherein the speech-based features comprise mel-frequency cepstral coefficients.

3. The method according to claim 1, wherein computing the visual-based features comprises computing a local binary pattern analysis.

4. The method according to claim 1, wherein the visual-based features comprise a histogram of oriented gradients.

5. The method according to claim 1, wherein computing the visual-based features comprises performing a region of interest analysis.

6. The method according to claim 1, wherein comparing the audio temporal alignment between the first and the second audio signals to the video temporal alignment between the first and the second video signals comprises projecting the audio temporal alignment on a video domain comprising the first and the second video signals and comparing the projected audio temporal alignment to the video temporal alignment.

7. The method according to claim 1, wherein comparing the audio temporal alignment between the first and the second audio signals to the video temporal alignment between the first and the second video signals comprises projecting the video temporal alignment on an audio domain comprising the first and second audio signals and comparing the projected video temporal alignment to the audio temporal alignment.

8. An apparatus for preventing a replay attack, comprising:
a microphone;
a display configured to present a passphrase; and
a processor configured:
to receive, at a first time, first video and first audio signals generated in response to a user uttering the passphrase,
to receive, at a second time subsequent to the first time, second video and second audio signals generated respectively by a camera and the microphone in response to the user uttering the passphrase, to extract, from the received audio signals, speech-based features,
to extract, from the received video signals, visual-based features,
to compute an audio temporal alignment between the first and the second audio signals, by computing a dynamic time warping on the audio-based features extracted from the first and second audio signals, the audio temporal alignment comprising a first registration that synchronizes the first and the second audio signals,
to compute a video temporal alignment between the first and the second video signals, by computing a dynamic time warping on the video-based features extracted from the first and second video signals, the video temporal alignment comprising a second registration that synchronizes the first and the second video signals,
to compare the audio temporal alignment between the first and the second audio signals to the video temporal alignment between the first and the second video signals, and to successfully authenticate the user upon detecting, as a result of the comparing, that the audio and video temporal alignments are synchronized, and
to fail the authentication of the user upon detecting, as a result of the comparison that the audio and the video temporal alignments are not synchronized.

9. The apparatus according to claim 8, wherein the speech-based features comprise mel-frequency cepstral coefficients.

10. The apparatus according to claim 8, wherein the processor is configured to compute the visual-based features by computing a local binary pattern analysis.

11. The apparatus according to claim 8, wherein the visual-based features comprise a histogram of oriented gradients.

12. A computer program product for preventing a replay attack, the computer program product comprising:
a non-transitory computer readable storage medium having computer readable program code embodied therewith, the computer readable program code comprising:
computer readable program code configured to receive, at a first time, first video and first audio signals generated in response to a user uttering a passphrase;
computer readable program code configured to receive, at a second time subsequent to the first time, second video and second audio signals generated respectively by a camera and a microphone in response the user uttering the passphrase;
computer readable program code configured to extract, from the received audio signals, speech-based features;
computer readable program code configured to extract, from the received video signals;
computer readable program code configured to compute an audio temporal alignment between the first and the second audio signals, by computing a dynamic time warping on the audio-based features extracted from the first and second audio signals, the audio temporal alignment comprising a first registration that synchronizes the first and the second audio signals;
computer readable program code configured to compute, by the processor, a video temporal alignment between the first and the second video signals, by computing a dynamic time warping on the video-based features extracted from the first and second video signals, the video temporal alignment comprising a second registration that synchronizes the first and the second video signals; and computer readable program code configured to compare the audio temporal alignment between the first and the second audio signals to the video temporal alignment between the first and the second video signals; and computer readable program code configured to successfully authenticate the user upon detecting, as a result of the comparing, that the audio and the video temporal alignments are synchronized; and computer readable program code configured to fail the authentication of the user upon detecting, as a result of the comparison that the audio and the video temporal alignments are not synchronized.

13. The computer program product according to claim 12, wherein the computer readable program code is configured to compute the visual-based features by computing a local binary pattern analysis.

* * * * *